United States Patent
Holz et al.

(10) Patent No.: US 6,552,342 B2
(45) Date of Patent: Apr. 22, 2003

(54) SYSTEM FOR IMPROVING THE VISIBILITY IN VEHICLES

(75) Inventors: Michael Holz, Senden (DE); Edgar Weidel, Senden (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/765,216

(22) Filed: Jan. 18, 2001

(65) Prior Publication Data

US 2001/0050340 A1 Dec. 13, 2001

(30) Foreign Application Priority Data

Jan. 18, 2000 (DE) .......................................... 100 02 069

(51) Int. Cl.[7] .................................................. G01J 5/10
(52) U.S. Cl. ...................... 250/330; 250/334; 250/341.8
(58) Field of Search ................................. 250/330, 334, 250/341.8; 340/436; 362/464, 465, 466

(56) References Cited

U.S. PATENT DOCUMENTS 5,530,240 A * 6/1996 Larson et al. .......... 250/214 AL
6,150,930 A * 11/2000 Cooper ........................ 340/435

FOREIGN PATENT DOCUMENTS

| DE | 20 01 086 C3 | 7/1971 | |
| DE | 38 26 095 A1 | 4/1990 | ............... B60J/3/04 |
| DE | 40 07 646 | 9/1991 | ........... G01S/17/88 |
| DE | 40 32 927 C2 | 4/1992 | ............ H04N/5/33 |

* cited by examiner

Primary Examiner—Constantine Hannaher
Assistant Examiner—Timothy Moran
(74) Attorney, Agent, or Firm—Pendorf & Cutliff (57) ABSTRACT

A system for improving the visibility in vehicles, including the following: an illumination optical system (2) for continuous radiation of infrared pulsed light; an associated receiver optical system (3) for receiving reflected components of the radiated light; a display (4) for representing information obtained by the receiver optical system (3), and a device (5, 6) for determining the presence of glare in the receiver optical system (3) from a foreign vehicle illumination optical system and for changing the keying interval or duty cycle of the infrared pulsed light of the illumination optical system (2) driven with fixed keying interval in dependence upon the vehicle direction of travel in such a manner that the glare is eliminated. Therein the illumination optical system is driven is driven with a fixed keying interval depending upon the vehicle direction of travel or, in certain cases, the direction of illumination. In an alternative embodiment, the illumination optical system (2) is operated at a wavelength which depends upon the vehicle direction of travel or, in certain cases, the direction of illumination.

18 Claims, 6 Drawing Sheets

SYSTEM FOR IMPROVING THE VISIBILITY IN VEHICLES

BACKGROUND OF THE INVENTION

1. Field of the Invention

The present invention is in general concerned with a system for improving visibility in vehicles.

Poor visibility at night is a strenuous and dangerous condition, which causes anxiety in many vehicle operators. As a consequence of the poor visibility, the occurrences of accidents is significantly higher at night, in comparison to vehicle operation in the daytime under good visibility. Herein the difficulties with night visibility can be categorized as follows:

The range of visibility when facing headlights of oncoming vehicles is not far, and is over-estimated by many vehicle operators. This results in a too late a recognition of non-illuminated obstacles, pedestrians, bicycles without lights and of animals, and therewith to accidents.

The vehicle operator is blinded by the headlights of oncoming vehicles and their reflections, above all in the case of wet roads, and the vehicle is for a short period of time operating in a "black hole." Operators with night blindness and older vehicle operators are particularly susceptible because of their lower visual acuity.

In rain, fog and drifting snow, the visibility conditions can again be significantly worsened.

2. Description of the Related Art

An improvement of visibility at night is provided by an optoelectronic system which as set forth in DE-A-40 07 646. This system records a video image of a scene and presents it in enhanced or optimized form to the vehicle operator. The represented image shows substantially more than the vehicle operator can see with his own eyes directly through the windshield.

The system known from DE-A-40 07 646 contains, in addition to the conventional headlights, two "laser headlights", which use near infrared emitting laser diodes as the light source. The laser diodes are driven pulsed with a pulse length of for example 50–100 μs and a pulse interval of 100–1000 μs. Therein the illumination of the scene can occur with a strip or with a point shaped pattern, whereby a plastic accentuation of the illuminated objects such as, for example, automobiles as distinguished from the road surface, can be achieved. A CCD-camera recording the video image is incorporated in the roof area of the vehicle. The CCD-camera includes an electronic shutter, which is synchronized with the laser diodes for avoidance of interferences or disturbances. By the synchronization of the CCD-camera with the emitting laser diodes it can be ensured that only light from the strips or surfaces illuminated by the laser diodes are used for the image construction, and that received light which has been diffused and received from other angular directions does not interfere. The details of the synchronization are described in DE-A-40 07 646 and are not repeated herein to avoid unnecessary repetition.

According to DE-A-40 07 646 an optical bandpass filter is provided in front of the camera objective or lense. The video image is displayed to the vehicle operator on a LCD-image screen. The utilization of laser light as described in DE-A-40 07 646 has a number of advantages. The laser emits in the wavelength of 800–2000 nm, preferably 810 nm in the near infrared. Since the infrared light is almost invisible to the human eye, illumination can be continuous wide open without restriction.

By using laser light, the glare or blinding of the camera by the visible headlights of oncoming vehicles can be substantially reduced. On the one hand the laser light possess a spectral breadth of only a few nm, while visible light sources such as halogen lights are hundreds of nm wide. If one provides an optical bandpass filter with a narrow pass breadth in front of the camera objective, then almost the entire laser light is emitted, while the light of oncoming vehicles is attenuated by a factor of 50–100. On the other hand, the laser diodes respond immediately to the driver current, and they can thus be pulsed rapidly in a simple manner. If one employs a video camera with a rapid electronic shutter, which is synchronized with the lasers, then the light of oncoming vehicles can be even further reduced.

A problem occurs however when two night visibility systems of this type with permanently operational laser headlights encounter each other. In DE 4007646 A1 the problem was solved in that the laser headlights of all vehicles emit with the same polarization, for example vertical polarization and in front of the camera objective or lens a thereto perpendicular analyzer or polarizer is present.

A disadvantage in the employment of polarizers and analyzers is however the weakening of the depolarized light reflected from the objects through the analyzer, which generally involves a factor of 2 to 4.

A device for a glare-free guidance of vehicles in traffic is known from DE 2001086 C3. A screen with variable light transmitivity is provided in the field of vision of the vehicle driver and the headlights are provided with flashlight sources. The light transmitivity of the screen is controlled electrically with a predetermined pulse frequency via a control device and varied between almost full transmitivity and strongly reduced light transmitivity.

From the publication DE 3836095 A1 a device is known for glare-free guidance of vehicles in traffic, in which likewise in the field of vision of the vehicle driver a screen is provided, with a light transmitivity which is controllable via a control device with a predetermined pulse frequency. This device also includes headlights for permanent emanation of pulsed infrared light. The control device is connected to a photo-electric receiver, which is so arranged, that it recognizes light emitted by an oncoming vehicle as foreign light and in the case of occurrence of pulsed foreign light so controls the screen and headlights that they are synchronized and in opposition to the pulsed foreign light, in such a manner, that respectively with high light emission of the foreign light the light transmitivity of the screen and the light emission of headlights are reduced.

SUMMARY OF THE INVENTION

It is thus the task of the present invention to make available a system for improvement of visibility in vehicles, which suppresses the emitted light from oncoming vehicles with permanent open-diaphragm laser headlights without losses.

BRIEF DESCRIPTION OF THE DRAWINGS

Further characteristics and advantages are more clearly illustrated in the following description of the preferred embodiments of the invention, with reference to the associated figures, wherein.

DETAILED DESCRIPTION OF THE INVENTION

Figure 1:
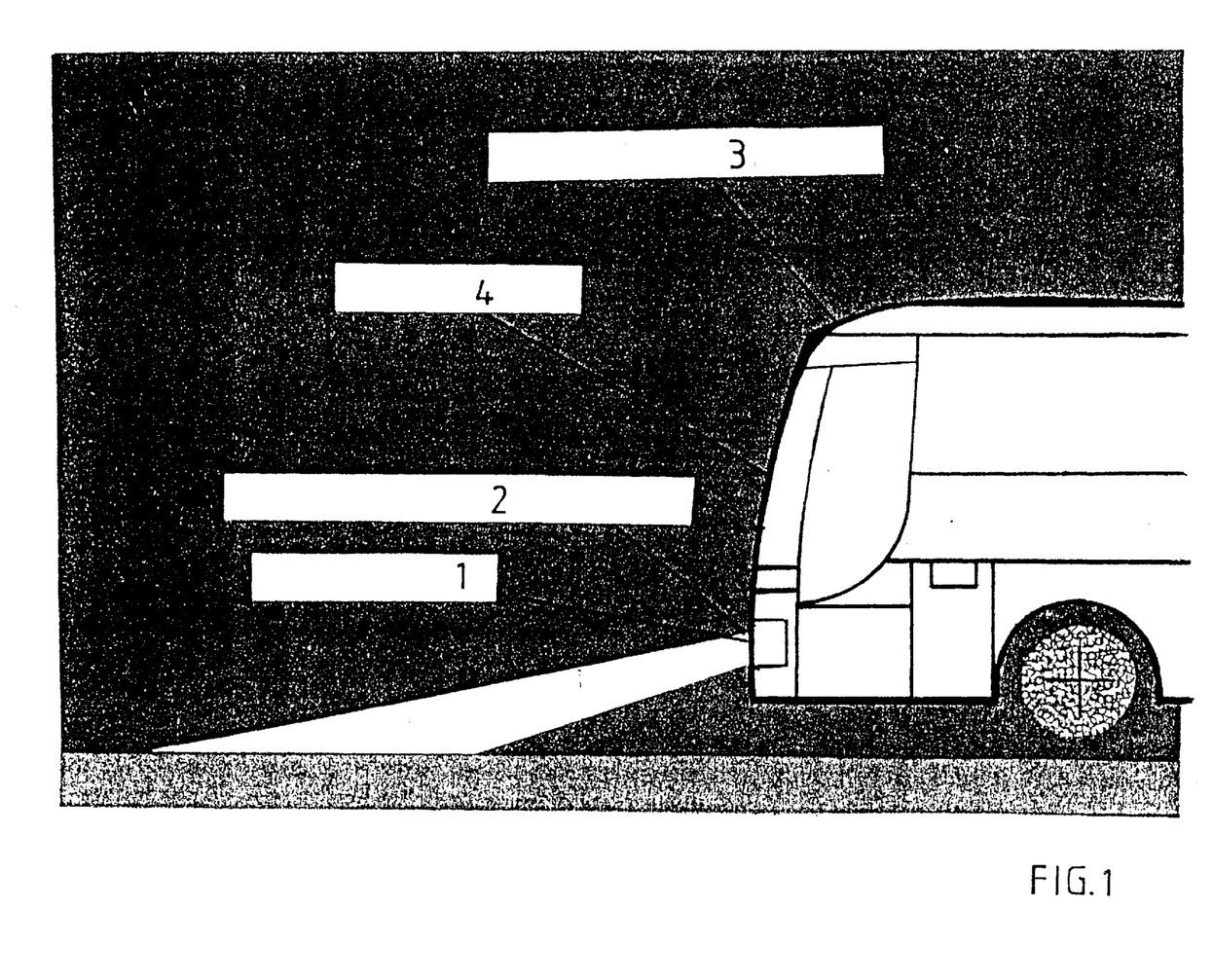
FIG. 1 is a schematic view of the overall design of the inventive system for improvement of visibility in a vehicle which, for illustrative purposes, is represented as a bus.

With reference to FIG. 1, a bus is shown which is equipped with headlights emitting in the visible range and with corresponding laser headlights 2 provided above the headlights 1. The number of the laser headlights 2 can be variably selected depending upon requirements, although in the following preferred embodiment two of this type of laser headlights are provided, which preferably respectively are provided in a blinker housing below the blinkers. The laser headlights emit continuously and pulsed in the infrared or as the case may be near infrared range, wherein preferably wavelengths of 800 to 2000 nm are employed.

The inventive system further includes a CCD-camera 3, which in the embodiment shown in FIG. 1 is provided in the roof area of the bus. The design of the CCD-camera is described in greater detail with respect to FIG. 4.

The display of the detected scene occurs on an image screen 4 provided on the dashboard or instrument panel of the bus, which preferably is provided a sufficient distance from the driver, in order to avoid requiring adaptation of the eye to the image screen, as soon as the driver moves his gaze from the outside scene to the image screen. A space of approximately two meters was found to be sufficient for the present embodiment.

In accordance with the present invention, a pulsed laser light source is employed as the laser headlight 2 to make possible the utilization of various time slots, so that the glare from oncoming laser headlights is avoided. The keying interval or duty factor—laser to laser—can be varied between 1:3 and 1:100, wherein in FIG. 2 a keying interval of 1:100 is illustrated. Preferably laser diodes with an output capacity of 2–10 watt, most preferably about 4 watt at a wavelength of approximately 800 nm are employed as the laser light source. This wavelength range is not detectable to the human eye, and thus a permanent illumination is possible.

Figure 2:
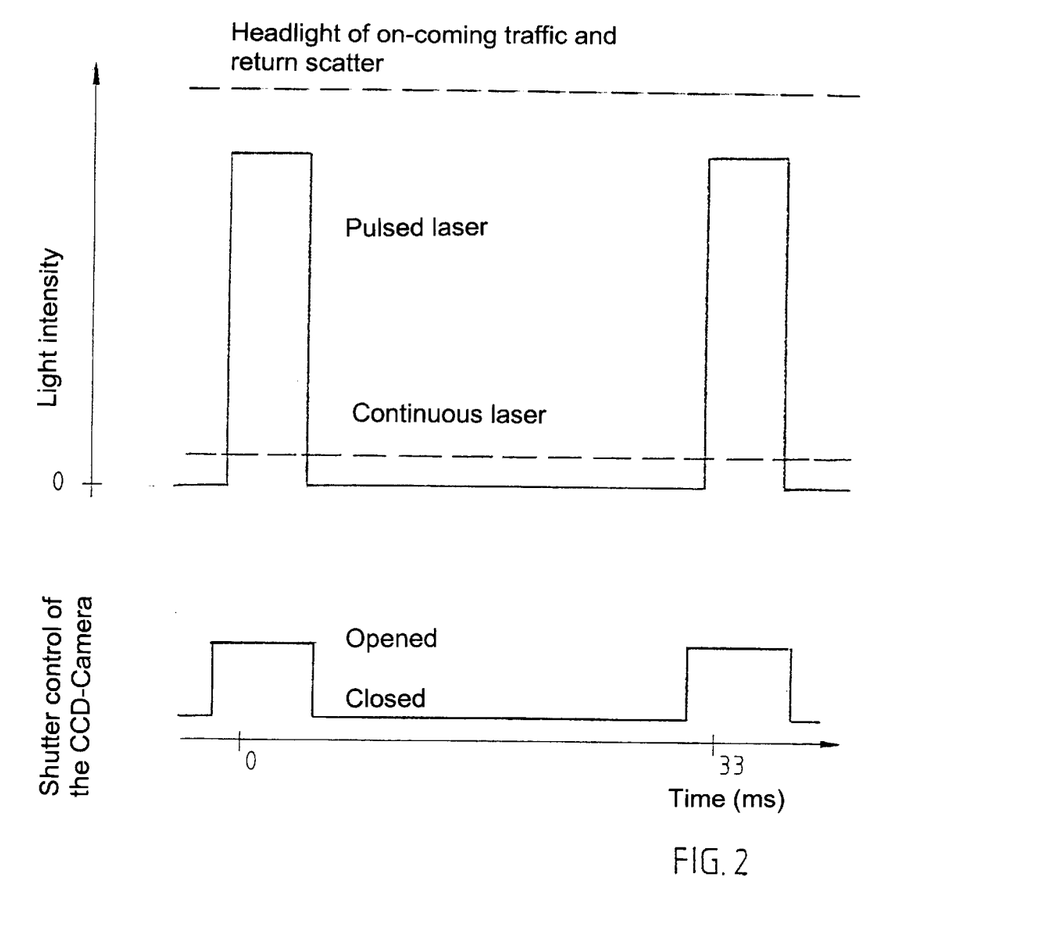
FIG. 2 is a time graph representing the intensities of the pulsed laser light source and the synchronization of the CCD-camera with the emitting laser diodes of the laser light source.

As is well known, laser diodes respond quickly to a driver current and can thus be easily driven in a pulsed mode. By the pulsed driving a relatively high output is achieved in the time slots, as shown in FIG. 2, which can then be detected by synchronization with the shutter speed of the CCD-camera as shown at the bottom of FIG. 2. The pulsed driving and the utilization of the time slots in the inventive system further minimizes the interfering light caused by the headlights and reflections of the oncoming traffic, which could otherwise result in a glare or blinding of the CCD-camera.

Figure 3:
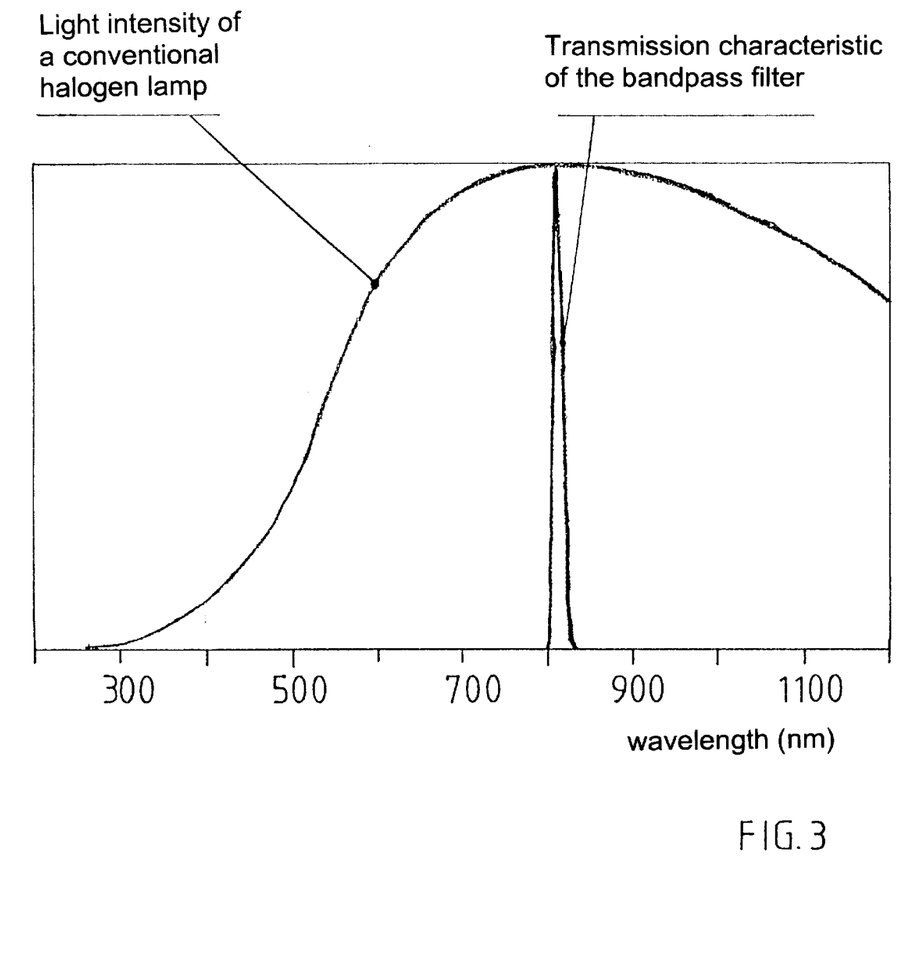
FIG. 3 shows the transmission characteristic of one of the bandpass filters employed in the inventive system as well as the light intensity distribution of a conventional halogen lamp.

The glare in the CCD-camera is further reduced by the employment of a spectral bandpass filter F, which exhibits a transmission or transition characteristic illustrated in FIG. 3. A bandpass filter of this type is known from DE-A-40 07 646 and need not be further described herein.

Figure 4:
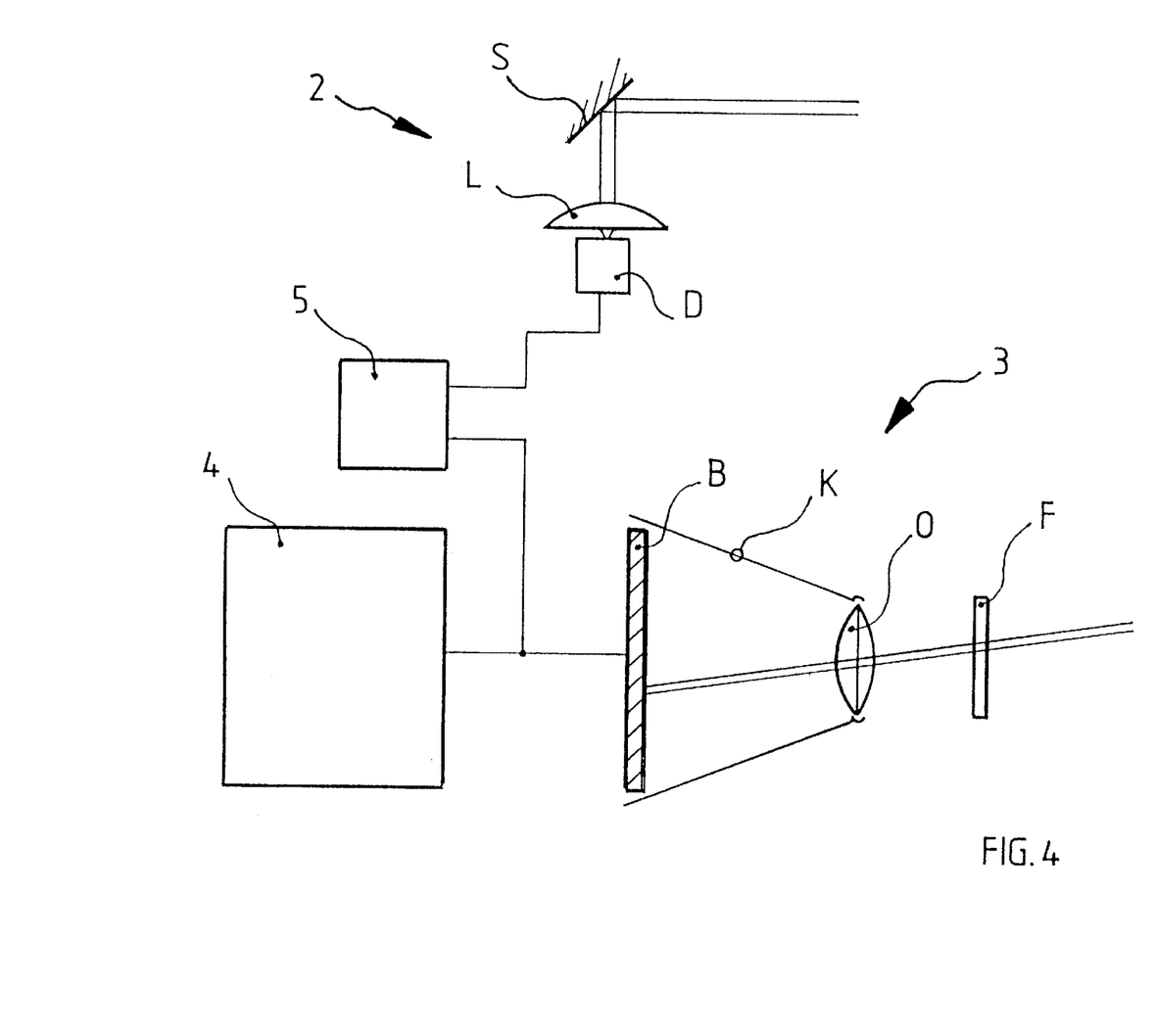
FIG. 4 represents a first embodiment of the invention, in which the determination, as to whether there is glare from a laser headlight of an oncoming vehicle, is undertaken on the basis of the data of the video image.

A first embodiment of the invention is illustrated by reference to FIG. 4, in which the detection of possible glare from the laser headlights of an oncoming vehicle is undertaken on the basis of the data of the video image. The laser headlight 2 which in and of itself is known from DE-A-40 07 646 includes a emitting laser diode D, of which the laser beam is emitted via a corresponding lens L and a mirror S. The laser headlight 2 functions, as described in DE-A-40 07 646, by the widening of the laser beam in only one direction with simultaneous narrow bundling in the orthogonal second direction, and by pivoting the emitted flat space angle segment in the second direction. It is however conceivable, to use the other two procedures described in DE-A-40 07 646 for illumination of the space angle area by simultaneous illumination of the entire area by two dimensional beam widening or by pivoting of a bundled laser in two dimensions for the sensing illumination of the entire space angle area.

The CCD-camera indicated with 3 includes the spectral bandpass filter F, an optical system O in series, as well as a light sensitive image surface B, of which the signal is supplied to the image screen 4.

In the first embodiment the system, a checking of whether a glare from a laser headlight is present occurs in that the data of the video image itself is evaluated by a evaluation device 5. In the case of glare the key interval of the laser diode D is changed by a supplemental delay. This delay can be random-generated. If the glare persists, the procedure is repeated, until no glare is present. The change is supplied to the laser diode D or, as the case may be, its control electronic not described in greater detail herein.

Figure 5:
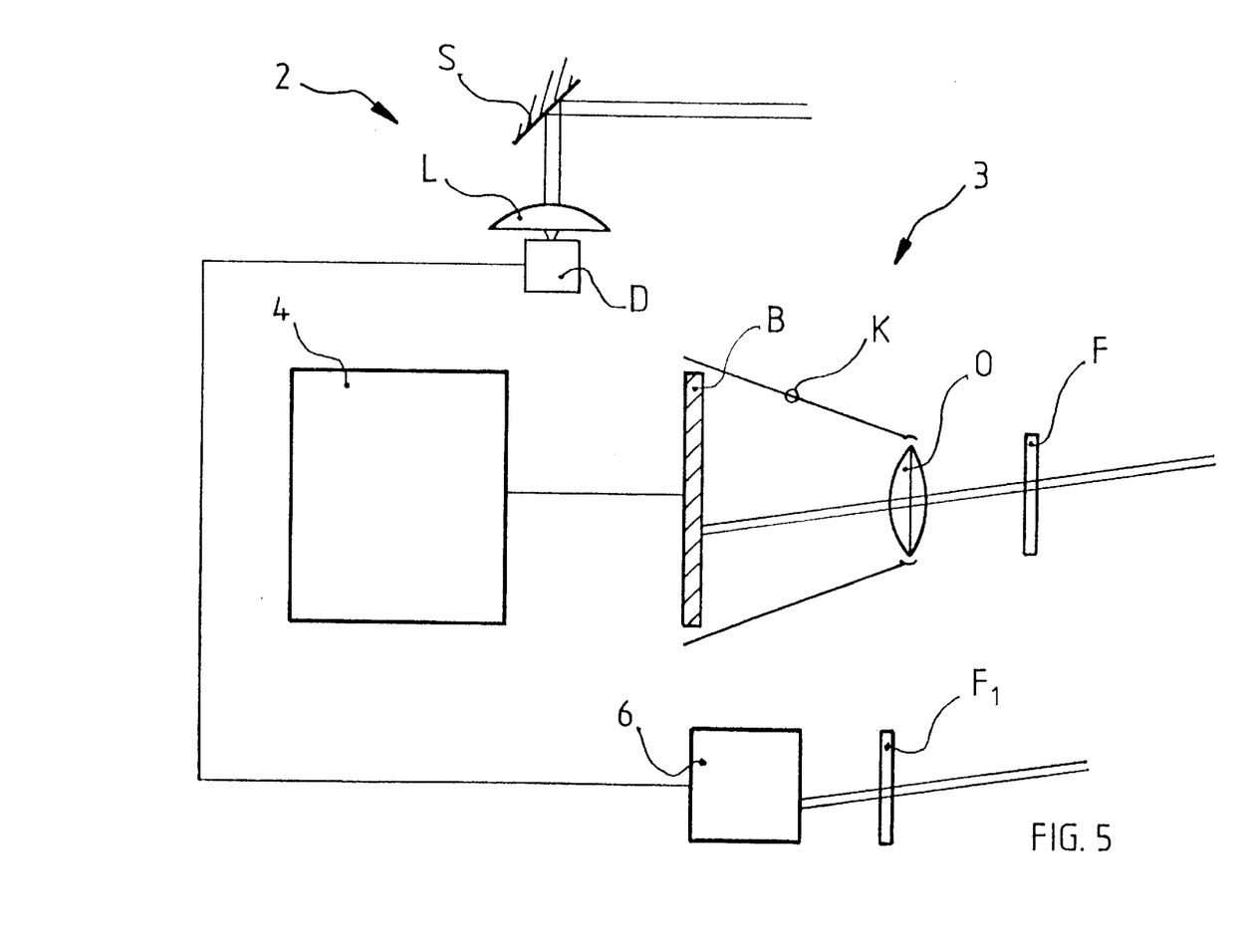
FIG. 5 represents a second embodiment of the invention, in which the determination, as to whether there is glare from a laser headlight of an oncoming vehicle, is undertaken on the basis of a separate detector.

In the second inventive embodiment according to FIG. 5, in place of the evaluation device 5 a supplemental detector 6 with a small band interference filter F1 is employed, which over time determines the laser pulses and therewith already the duty cycle of the oncoming laser headlights. In the case of glare the key interval, as already described, is changed by a supplemental delay. This change can likewise be random-generated. In the supplemental detector a free time slot can also be directly controlled. Should the glare continue, then also in this second embodiment the procedure is repeated until no glare remains any longer.

Figure 6:
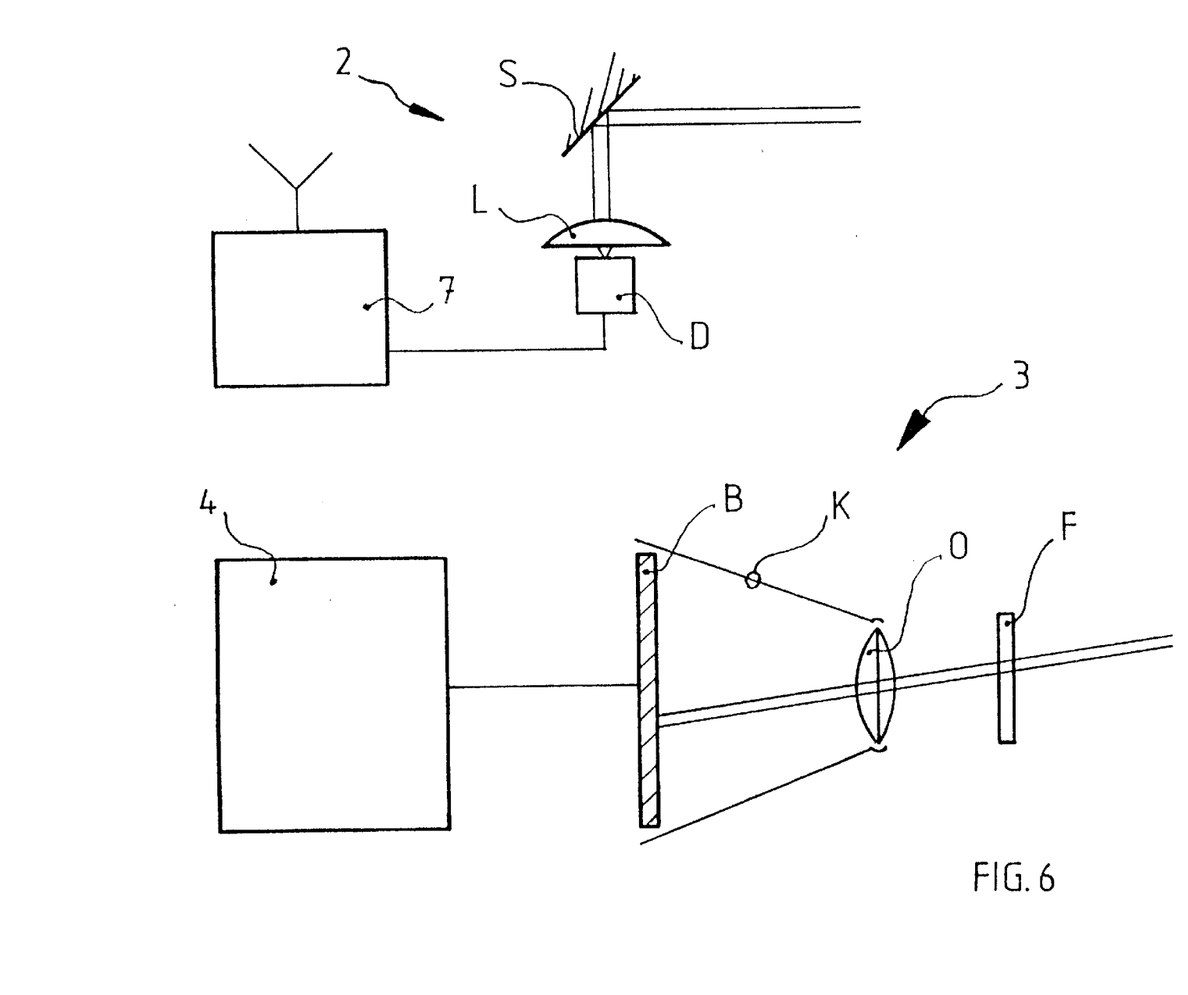
FIG. 6 represents a third embodiment of the invention, in which the determination as to whether there is glare from a laser headlight of an oncoming vehicle, occurs on the basis of a fixed time cadence or cycle.

In a third embodiment, as shown in FIG. 6, a fixed key interval is established for all vehicles. The precise synchronization of all vehicles can be time-coordinated either via a radio signal, radio telephone or GPS (Global Positioning System) in a radio device indicated with 7. Therein a precision of 1 ms to 5 ms is sufficient. Using an internal quartz clock the precise key interval is maintained between the time calibrations. An electronic compass determines the direction of travel. For a set predetermined direction range—for example between North and East, East and South, South and West, West and North—a different time slot is utilized. In this manner a glare is precluded.

In a fourth embodiment multiple, for example three laser headlights with varying wavelengths—800 nm, 820 nm, 840 nm—and varying bandpass filters F for these wavelengths are utilized in a filter wheel in front of the camera. Further, an electronic compass is used for determining the direction of travel. Depending upon direction of travel, a laser with a predetermined wavelength and the associated bandpass filter of the filter wheel is employed.

Within the term "electronic compass" in the sense of this application there is included also a means which receives or determines direction information from following (tracking) of position information (for example GPS-information), comparable to the direction information obtainable from a compass. Above all, in the case of the utilization of pivotable illumination optics 2, it can be useful, to provide a means, which takes into consideration a possible offset between the vehicle direction of travel or, as the case may be, the orientation of the vehicle and the actual illumination direction.

From the inventive task, the person of ordinary skill understands that within the concept of the vehicle-direction-dependent operation of the illumination optics 2, there is meant the illumination direction of the illumination optics 2, which in general corresponds to the illumination direction of the visible light emitting headlights of the vehicle.

Above all in the case of employment of multiple illumination optics 2 and receiver optics in a vehicle it is of advantage to operate these independent of the direction of travel and depending upon their illumination direction.

The elements of such a system of one or more optics 2 and 3 are herein the same as in the operation associated with the vehicle direction of travel; however, the illumination optics 2 are now operated dependent upon their actual illumination direction. This occurs for example in the recently popular headlights with controllable illumination direction, that is, pivotable headlights. These headlights can for example follow the direction of the curvature of roads or in the case of detecting hazards in the peripheral areas of the vehicle lane can be directed thereto. This alternative embodiment of the invention also contributes in the case of use of rearwards facing headlights or as the case may be search beams (for example in rescue vehicles).

If a vehicle drives in reverse, then the main headlights of the vehicle remain directed in the same direction as in the case of driving forwards. For this reason their operation should also be independent of the vehicle traveling direction which is now against the flow, and should remain operated in the same way in order to avoid blinding other vehicles.

It is also possible through the alternative, which respect to the traffic in the illuminated direction, to avoid the glare of the illumination optics from standing or parked vehicles with switched-on illumination.

In a particularly advantageous manner the information received by the receiver optics 3 of the inventive system can be represented in a suitable manner for human recognition, preferably a display. If however this information is used only for technical systems, it is also conceivable to realize the system without such a system for information representation.

What is claimed is:

1. A system for improving the visibility of the environment of a vehicle to a vehicle operator, the system comprising at least one illumination optical system (2) for radiation of infrared pulsed light from the vehicle to the environment of the vehicle, and at least one associated receiver optical system (3) for receiving reflected components of the radiated light and generating a display to the vehicle operator, wherein the illumination optical system (2) includes means for operation which is dependent upon the direction of illumination, and wherein a compass system is provided for determination of the compass direction of illumination.

2. A system according to claim 1, wherein the compass system is an electronic compass system.

3. A system according to claim 2, wherein the electronic compass is based on a position determining system or a navigation device.

4. A system according to claim 1, wherein the illumination optical system (2) is a part of a laser headlight, which includes a laser diode (D) which emits in the range of 800 to 2000 nm, preferably 810 nm, with an output of approximately 4 watt, emitting an infrared light with a keying interval or duty cycle of between 1:3 and 1:100.

5. A system according to claim 1, wherein the illumination optical system (2) includes a means for operation at a fixed keying interval which is dependent upon the direction of illumination of the vehicle.

6. A system according to claim 5, wherein the system includes a radio device (7) for receiving a fixed timing or clock pulse, wherein a means is provided for selection of the timing or clock pulse depending upon the direction of travel.

7. A system according to claim 6, wherein the radio device (7) comprises a radio clock or a radio telephone or a global positioning system.

8. A system according to claim 1, wherein the illumination optical system (2) includes a means of operation dependent upon the vehicle direction of illumination and at a wavelength dependent upon the vehicle direction of illumination.

9. A system according to claim 8, wherein the receiver optical system (3) includes a bandpass filter corresponding to each of the wavelengths of the illumination optical system (2) and wherein a means is provided for selecting the wavelengths of the illumination optical system and the bandpass filter depending upon the vehicle direction of illumination.

10. A system according to claim 9, wherein the bandpass filter of the receiver optical system (3) is provided on a filter wheel.

11. A system according to claim 8, wherein the system includes a means for selecting the wavelength of the pulsed light emitted by the illumination optical system (2) in the range of about 800 nm.

12. A system according to claim 8, wherein the system includes a means for selecting a wavelength of the pulsed light emitted by the illumination optical system (2) in the range of about 800–880 nm.

13. A system according to claim 8, wherein the system includes three or more laser headlights, each headlight operating at a different wavelength.

14. A system as in claim 13, wherein a first laser headlight operates at about 800 nm, a second laser headlight operates at about 820 nm, and a third laser headlight operates at about 840 nm.

15. A system according to claim 1, wherein the information by the receiver optical system (3) is reproduced in a manner recognizable by humans.

16. A system according to claim 1, wherein the information received by the receiver optical system (3) is reproduced in a display visible to the vehicle operator.

17. A system according to claim 1, wherein the illumination optical system (2) is a part of a laser headlight, which includes a laser diode (D) which emits with a wavelength of 810 nm, with an output of approximately 4 watt, emitting an infrared light with a keying interval or duty cycle of between 1:3 and 1:100.

18. A system for preventing optoelectronic headlight interference between first and second vehicles equipped with optoelectronic headlights, said system comprising at least one illumination optical system (2) for radiation of infrared pulsed light from each vehicle to at least one direction in the environment of the vehicle, at least one associated receiver optical system (3) in each vehicle for receiving reflected components of the radiated light and generating a display to a vehicle operator, and a compass system for determination of the compass direction of illumination of said infrared pulsed light from the vehicle, wherein each illumination optical system (2) includes means for operation of the infrared pulsed light which is dependent upon the direction of illumination, such that the operation of said infrared pulsed lights from each of said vehicles is coordinated so that interfereence with the optoelectronic system of the other vehicle is minimized.

* * * * *